(12) United States Patent
Park

(10) Patent No.: US 9,662,808 B2
(45) Date of Patent: May 30, 2017

(54) SYSTEM FOR PELLETIZING SOLID REFUSE FUEL

(71) Applicant: Suook Young Park, Paju-si (KR)

(72) Inventor: Suook Young Park, Paju-si (KR)

( * ) Notice: Subject to any disclaimer, the term of this patent is extended or adjusted under 35 U.S.C. 154(b) by 207 days.

(21) Appl. No.: 14/607,819

(22) Filed: Jan. 28, 2015

(65) Prior Publication Data
US 2015/0246464 A1 Sep. 3, 2015

(30) Foreign Application Priority Data
Feb. 28, 2014 (KR) .......................... 10-2014-0024587

(51) Int. Cl.
| | |
|---|---|
| *B29C 47/10* | (2006.01) |
| *B29C 47/50* | (2006.01) |
| *B29C 47/68* | (2006.01) |
| *B29B 13/10* | (2006.01) |
| *B29C 47/58* | (2006.01) |

(Continued)

(52) U.S. Cl.
CPC .......... *B29B 13/10* (2013.01); *B29B 17/0412* (2013.01); *B29C 47/1027* (2013.01); *B29C 47/50* (2013.01); *B29C 47/585* (2013.01); *B29C 47/686* (2013.01); *B29B 17/0042* (2013.01); *B29B 2017/0089* (2013.01); *B29B 2017/0224* (2013.01); *B29B 2017/0468* (2013.01); *B29K 2101/12* (2013.01); *B29K 2105/26* (2013.01); *Y02E 50/30* (2013.01); *Y02W 30/62* (2015.05)

(58) Field of Classification Search
CPC ..... B29B 13/10; B29B 17/00; B29B 17/0042; B29B 17/0412; B29B 2017/0031; B29B 2017/0089; B29B 2017/0224; B29B 2017/0468; B29C 47/1027; B29C 47/50; B29C 47/585; B29C 47/686

See application file for complete search history.

(56) References Cited

U.S. PATENT DOCUMENTS

| | | | | |
|---|---|---|---|---|
| 2,783,498 | A * | 3/1957 | Richardson | ......... B29C 47/0801 |
| | | | | 100/145 |
| 5,225,137 | A * | 7/1993 | Sadr | ........................ B29B 17/02 |
| | | | | 241/23 |

(Continued)

FOREIGN PATENT DOCUMENTS

KR 10-2007-0102789 A 10/2007

*Primary Examiner* — Yogendra Gupta
*Assistant Examiner* — Joseph Leyson
(74) *Attorney, Agent, or Firm* — Novick, Kim & Lee, PLLC; Jae Youn Kim

(57) ABSTRACT

Disclosed is a system for pelletizing Solid Refuse Fuel (SRF). The system includes: a first crusher that primarily crushes plastic waste; a vibration sieve plate-conveyer that transports plastic waste that is primarily crushed by the first crusher; a second crusher that secondarily crushes the primarily crushed plastic waste sieved by the vibration sieve plate-conveyer; a first rotational shaft equipped with a first screw that fuses and transports the plastic waste which is secondarily crushed by the second crusher; a filter unit that is combined with the first rotational shaft and which removes impurities by filtering the secondarily crushed plastic waste that is fused and transported by the first screw; a second rotational shaft equipped with a second screw that transports impurity-free plastic waste filtered by the filter unit; and a molding machine that molds the plastic waste transported by the second screw.

4 Claims, 6 Drawing Sheets

(51) Int. Cl.
   *B29B 17/04*   (2006.01)
   *B29K 105/26*   (2006.01)
   *B29K 101/12*   (2006.01)
   *B29B 17/02*   (2006.01)
   *B29B 17/00*   (2006.01)

(56) References Cited

U.S. PATENT DOCUMENTS

| | | | |
|---|---|---|---|
| 5,407,624 A * | 4/1995 | Engh, III | B29B 9/06 209/214 |
| 5,908,165 A * | 6/1999 | Guschall | B03B 9/061 241/23 |
| 2012/0091609 A1* | 4/2012 | Feichtinger | B29B 17/0026 264/37.31 |

\* cited by examiner

SYSTEM FOR PELLETIZING SOLID REFUSE FUEL

CROSS REFERENCE TO RELATED APPLICATION(S)

This application claims the benefit of Korean Patent Application No. 10-2014-0024587, filed on Feb. 28, 2014, which is hereby incorporated by reference in its entirety into this application.

BACKGROUND OF THE INVENTION

Field of the Invention

The present invention relates to a system for pelletizing Solid Refuse Fuel (SRF) to recycle plastic waste that occurs after plastic is used for agricultural, domestic, and industrial purposes. The present invention more particularly relates to a system for pelletizing SRF to recycle plastic waste instead of incinerating or disposing of plastic waste in landfills, without using cleaning water for cleaning the plastic waste, thereby preventing environmental pollution, more specifically water pollution.

Description of the Related Art

Generally, vinyl or plastic waste that occurs in a large amount in agricultural and fishing villages and industrial sites does not naturally degrade. Accordingly, it has so far been usually incinerated or disposed of in landfills. In the case of incineration, toxic fumes and incinerator ash containing hazardous heavy metals are generated, causing air pollution. On the other hand, in the case of disposal in landfills, it takes a very long time for the plastic waste to degrade or decay, also causing soil contamination. Therefore, reuse of plastic waste is a good way of dealing with plastic waste.

The most common practice to recycle vinyl or plastic waste is as follows (also, refer to the process flow of FIG. 1): collected vinyl or plastic waste is crushed or shredded by a crusher 1; the crushed or shredded raw material and water are put into a washing tank 2, so that impurities adhered to the crushed or shredded raw material are removed from the raw material; the raw material free of impurities is dehydrated in a dehydration tank 3; the dehydrated raw material is put into a melt-extruder 4 so as to be fused by heat, and then discharged outside the melt-extruder 4; the fused raw material is extruded through a predetermined size of a hole and cut into extrusion-molded beads having a predetermined size by a cutting device 5; extrusion-molded beads that are extruded and cut are thrown into a cooling tank 6 so that the extrusion-molded beads would not stick to each other; and the extrusion-molded beads are cooled down to a water temperature in the cooling tank 6, becoming pellets 7.

This recycling method uses a wet cleaning process in which water is used. Accordingly, although it is possible to almost perfectly remove impurities from the plastic waste, it is difficult to completely remove water from the plastic waste through the dehydration process. For this reason, the pellets are likely to contain moisture, resulting in degradation in quality of recycled products. Meanwhile, a hot air drying process may follow the dehydration process for perfect removal of moisture that remains after cleaning. However, this process increases recycling cost, resulting in a decline in competitiveness of the recycled products.

Korean Patent Application Publication No. 10-2007-0102789 (Patent Document 1) proposes a solution to this problem.

The device proposed in Patent Document 1 includes: a driving unit; a conveyer screw including a first bar-like body that is rotated by the driving unit, and helical threads that are formed at regular pitches on an outer surface of the first bar-like body and wound in a direction in which the bar-like body rotates; a dehydration screw including a second bar-like body that is rotated by the driving unit and shorter than the first bar-like body of the conveyer screw, and helical threads that are formed at regular pitches on an outer surface of the second bar-like body, wound in the same rotation direction of the first bar-like body, and arranged to be misaligned with the helical threads of the conveyer screw; a filter housing that has an inlet in a front portion and an outlet in a rear portion, encases the conveyer screw and the dehydration screw therein, has an internal diameter corresponding to an external diameter of the helical threads, and has a water discharge hole formed in a portion where the dehydration screw is arranged; and a heating unit that fuses plastic waste transported by the conveyer screw. The device can achieve a dehydration effect using the conveyer screw and the dehydration screw while fusing the plastic waste.

However, since the device uses a cleaning process using water, a dehydration effect cannot be sufficiently obtained.

The foregoing is intended merely to aid in the understanding of the background of the present invention, and is not intended to mean that the present invention falls within the purview of the related art that is already known to those skilled in the art.

Documents of Related Art (Patent Document 1) Korean Patent Application Publication No. 10-2007-0102789 titled "Melting Extruder for Recycling of Plastic Waste and Pelletizing System for Plastic Waste Using the Same" (published on Oct. 22, 2007)

SUMMARY OF THE INVENTION

Accordingly, the present invention has been made keeping in mind the above problems occurring in the related art, and an object of the present invention is to provide a system for pelletizing Solid Refuse Fuel (SRF) without using a wet cleaning process in which water is used. The system performs pelletizing by: filtering out impurities such as metallic particles, soil, or wood contained in a mixture of plastic waste that is crushed by a first crusher equipped with a crushing screw while transporting the plastic waste using a vibration sieve plate-conveyer equipped with a metal separator and provided with a recess; secondarily crushing the primarily crushed plastic waste transported into a hopper equipped with a second crusher; and secondarily filtering out the secondarily crushed plastic waste, which is fused by a rotational shaft while being transported, using a filter unit that has a multi-filter structure and is installed in the middle of the rotational shaft which is equipped with a hot wire, installed in the rotational shaft, and a conveyer screw, installed on the outer surface of the rotational shaft.

In order to accomplish the object of the invention, one aspect provides a system for pelletizing Solid Refuse Fuel (SRF), the system including: a first crusher that primarily crushes plastic waste introduced manually or by a conveyer belt; a vibration sieve plate-conveyer that transports primarily crushed plastic waste discharged from the first crusher; a hopper that stores the primarily crushed plastic waste discharged from the vibration sieve plate-conveyer; a second crusher that is disposed under the hopper and which secondarily crushes the primarily crushed plastic waste discharged from the hopper; a first rotational shaft that is disposed under the second crusher and is equipped with a first screw that fuses and transports secondarily crushed plastic waste discharged from the second crusher; a filter unit that is combined with the first rotational shaft and removes impurities by filtering the secondarily crushed plastic waste that is fused and transported by the first screw; a second rotational shaft equipped with a second screw that transports impurity-free plastic waste that is filtered by the filter unit; and a molding machine that molds the plastic waste transported by the second screw, wherein the first rotational shaft has a structure in which a hot wire is installed in the first rotational shaft and the first screw is installed on an outer surface of the first rotational shaft, thereby simultaneously fusing and transporting the secondarily crushed plastic waste processed by the second crusher, and wherein the second rotational shaft has a structure in which a cooling water pipe is installed in a portion of the second rotational shaft, thereby simultaneously transporting and cooling down the fused plastic waste transported by the first screw so that the fused plastic waste becomes gelled.

As described above, the system for pelletizing SRF according to the present invention has advantage of recycling plastic waste without using water, thereby preventing water pollution, reducing water treatment cost, treating a larger amount plastic waste compared to a wet process in which water is used, preventing air pollution attributable to incineration or landfill disposal of plastic waste, and reducing operation cost.

In addition, the system has another advantage of having a simple structure. Furthermore, the filter unit can be reused after dregs in the filter unit are removed because the filter is removable from the system. For this reason, the system has improved durability and incurs low cost.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
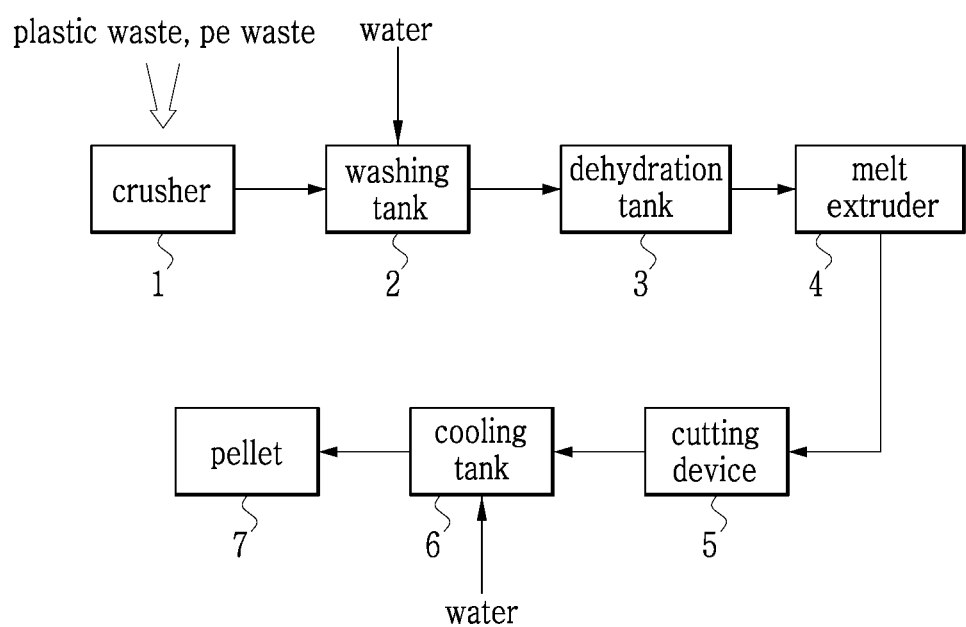
FIG. 1 is a block diagram illustrating operation processes performed by a wet recycling device for recycling plastic waste according to a conventional art.

A system for pelletizing Solid Refuse Fuel (SRF) according to the present invention will be described in detail below with reference to the accompanying drawings. Any specific description about functions or constructions that are well known in related arts will be omitted, when such a description is likely to obscure the gist of the present invention. The terms described below should be interpreted in consistent of their functions in the present invention. Terms are usually differently defined according to intension of a client, operator, or user or to custom. Therefore, the terms below should be interpreted as having meanings that are consistent with their meanings in the context of the relevant art and the present disclosure, and will not be interpreted in an idealized or overly formal sense unless expressly so defined herein.

Throughout the drawings, the same reference numerals will refer to the same or like parts.

Figure 2:
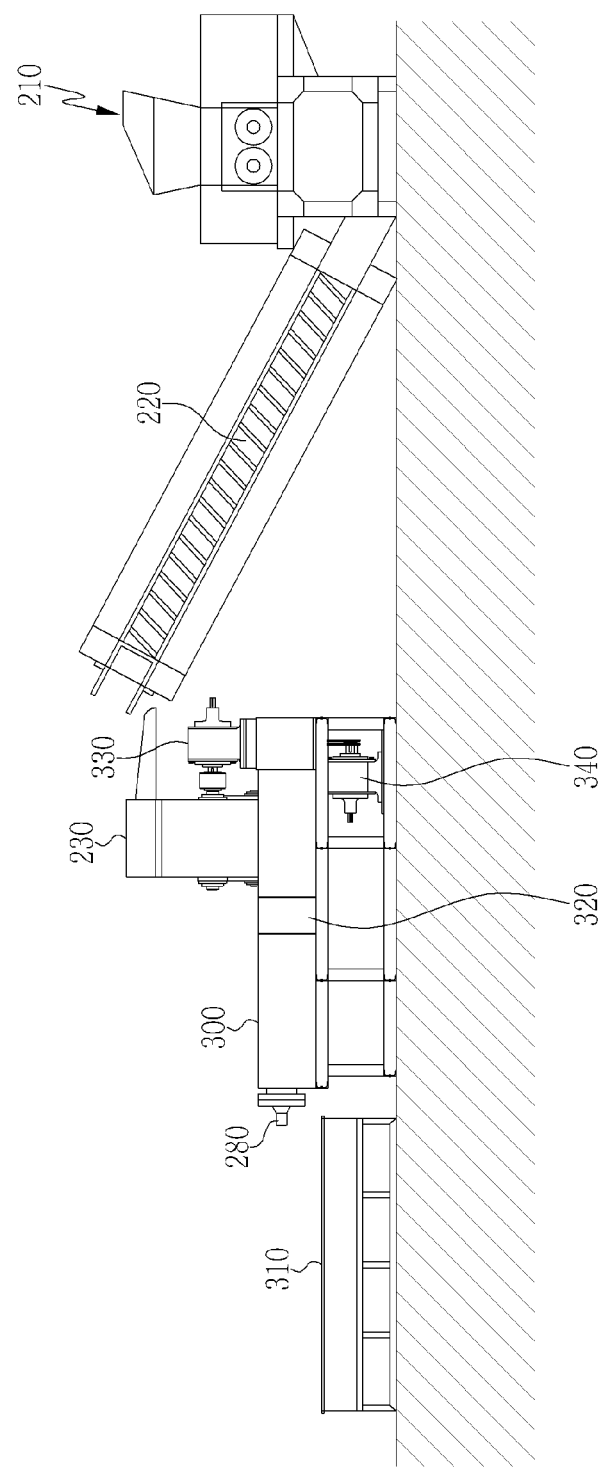
FIG. 2 is a schematic view illustrating a system for pelletizing Solid Refuse Fuel (SRF) according to one embodiment of the present invention.
Figure 3:
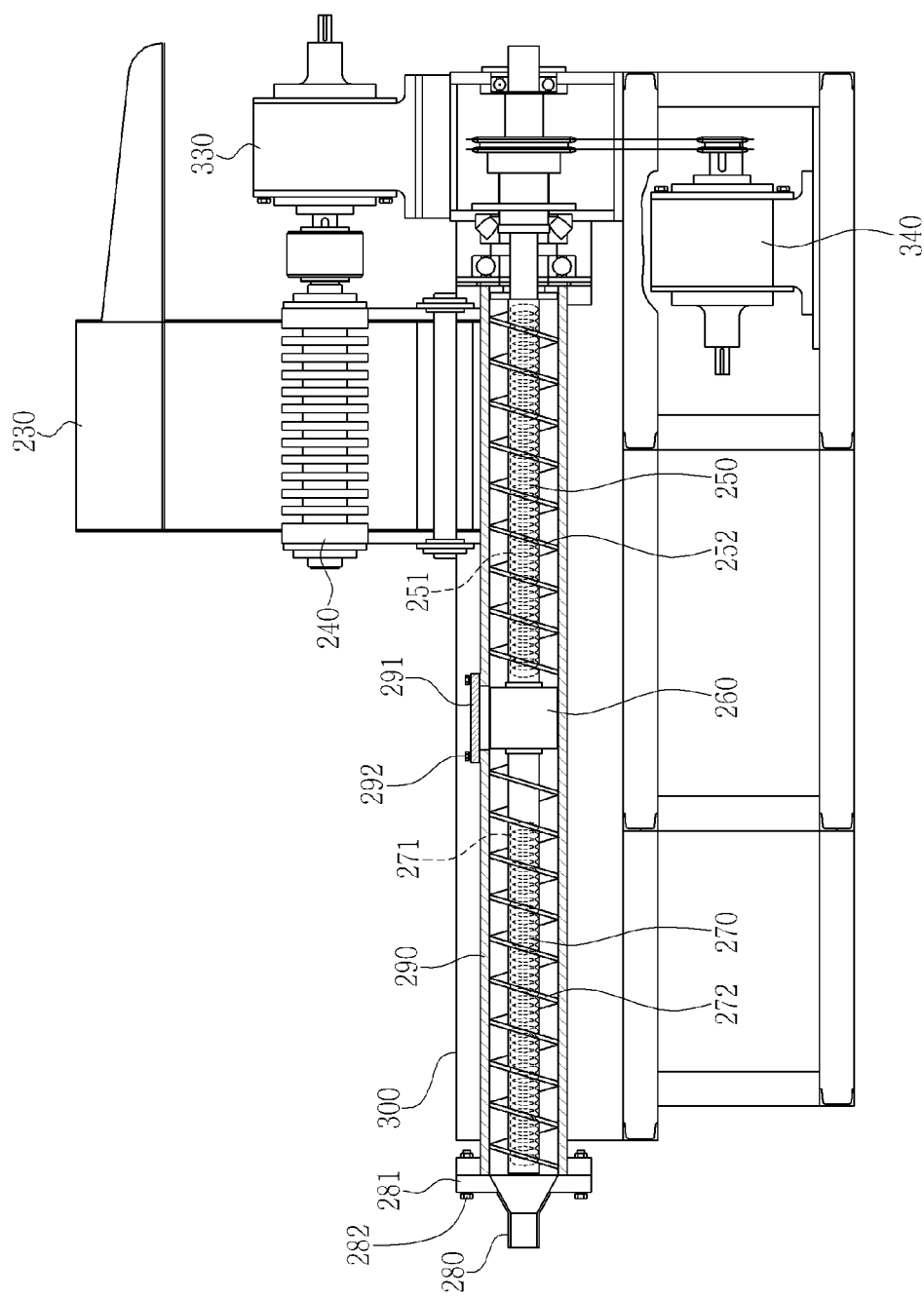
FIG. 3 is a view illustrating the detailed construction of a main part of the system illustrated in FIG. 2.
Figure 4A:
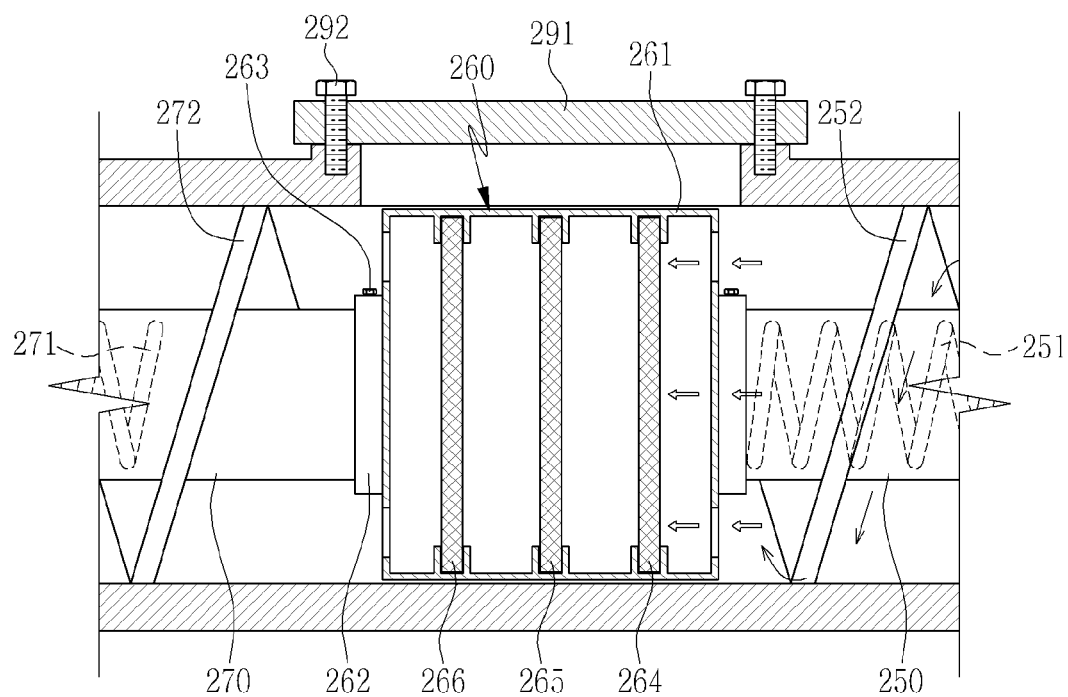
FIGS. 4A to 4C are views illustrating operation states of the main part illustrated in FIG. 3.
Figure 4B:
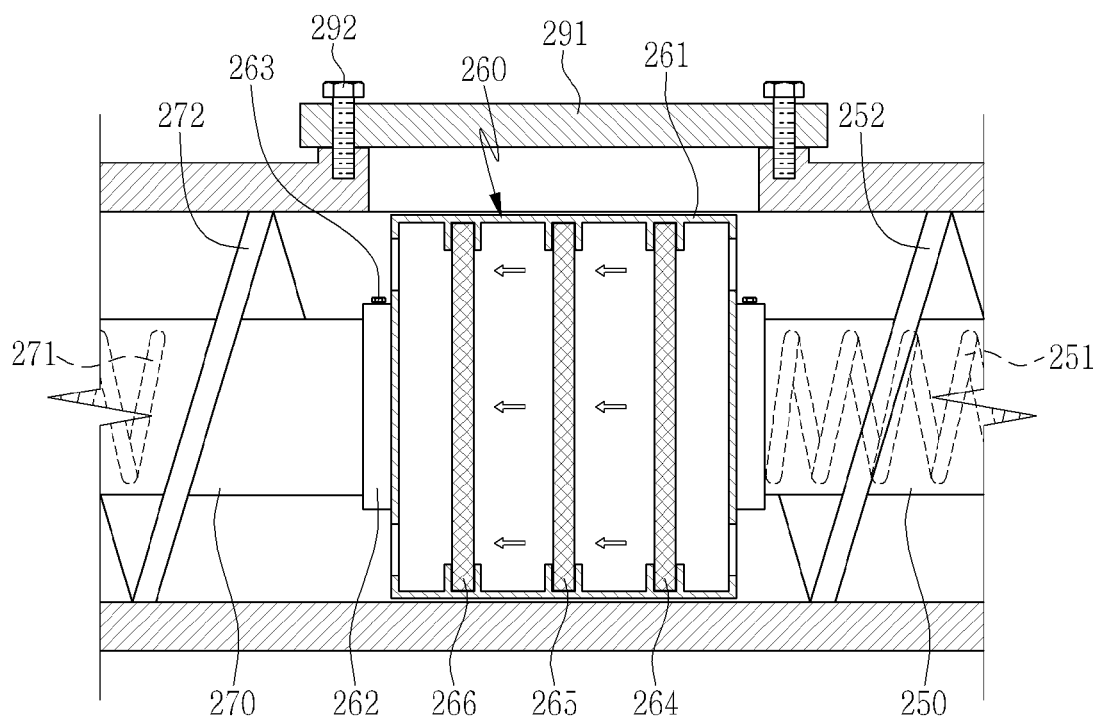
Figure 4C:
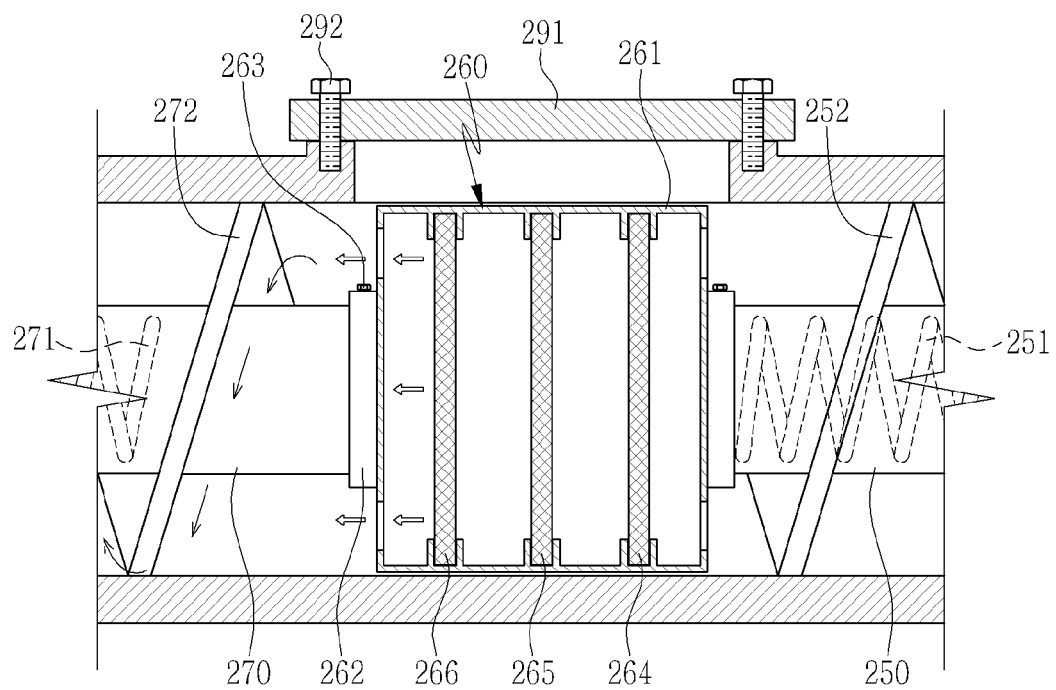

FIG. 2 is a schematic view illustrating a system for pelletizing Solid Refuse Fuel (SRF) according to one embodiment of the present invention; FIG. 3 is a view illustrating the detailed construction of a main part of the system illustrated in FIG. 2; and FIGS. 4A to 4C are views illustrating operation states of the main part illustrated in FIG. 3.

As illustrated in FIGS. 2 to 4C, the system for pelletizing SRF according to one embodiment of the present invention includes: a first crusher 210 that primarily crushes plastic waste, especially thermoplastic resin, introduced manually or by a conveyer belt after being collected, into shards of plastic having a size of several to several tens centimeters; a vibration sieve plate-conveyer 220 that transports the primarily crushed plastic waste discharged from the first crusher 210; a hopper 230 that stores the primarily crushed plastic waste discharged from the vibration sieve plate-conveyer 220; a second crusher 240 that is disposed under the hopper 230 and secondarily crushes the primarily crushed plastic waste, discharged from the hopper 230, into shards of plastic having a size of several millimeters to several centimeters; a first rotational shaft 250 that is disposed under the second crusher 240 and is combined with a first screw 252 that fuses and transports the secondarily crushed plastic waste discharged from the second crusher 240; a filter unit 260 that is combined with the first rotational shaft 250 and removes impurities by filtering the secondarily crushed plastic waste that is fused and transported by the first screw 252; a second rotational shaft 270 combined with a second screw 272 that transports plastic waste free of impurities, which is filtered by the filter unit 270; a molding machine 280 that molds the plastic waste transported by the second screw 272 into pellets having a predetermined shape; and a water tank 310 that cools down the molded pellets produced by the molding machine 280.

Herein, in the process in which the plastic waste is transported to be pelletized, the side at which the first crusher 210 is disposed is referred to as upstream and the side at which the molding machine 280 is disposed is referred to as downstream.

The first rotational shaft 250, the filter unit 260, and the second rotational shaft 270 are encased in a filter housing 290. The filter housing 290 is covered by a casing 300. A first door 291 is installed in a portion of the top surface of the filter housing 290 so that the filter unit 260 can be installed into and removed from the inside of the filter housing 290. The door 291 is coupled to the filter housing 290 by coupling bolts 292.

A second door 320 is installed in a portion of the casing 300, which corresponds to the first door 291. When installing or removing the filter unit 260, the second door 320 is first opened and the first door 291 is then opened. The second door 320 is coupled to the casing 300 by a known coupling means, for example, a bolt or hinge structure.

The vibration sieve plate-conveyer 220 takes the form of a sieve plate that has wire meshes or perforations. The impurities that are adhered to the primarily crushed plastic waste that is crushed into the shards having a size of several to several tens centimeters by the first crusher 210 are detached from the primarily crushed plastic waste by vibration and then discharged through the meshes or perforations. The vibration sieve plate-conveyer 220 is provided with a well-known metal separator (for example, a magnetic separator not illustrated), so that an infusible material such as metallic particles that are mixed with the plastic waste that is primarily crushed by the first crusher 210 is removed.

A hot wire 251 is installed in a hollow of the first rotational shaft 250, and the first screw 252 is installed on the outer surface of the first screw 252. This structure enables fusion and transportation of the secondarily crushed plastic waste that is crushed by the second crusher 240.

A cooling water pipe 271 is installed in a portion of a hollow of the second rotational shaft 270. Because of this structure, the fused plastic waste that is transported by the first screw 252 is cooled down to be gelled while being transported by the second screw 272. The first rotational shaft 250 and the second rotational shaft 270 are spaced from each other, and the filter unit 260 is inserted between the first rotational shaft 250 and the second rotational shaft 270.

The filter unit 260 is encased in the filter housing 261. The filter housing 261 has hollow protrusions 262 that have fixing holes. The filter unit 260 is fixed to the first rotational shaft 260 and the second rotational shaft 270 by bolts 263 inserted in the fixing holes.

In the filter unit 260, a first metallic filter 264, a second metallic filter 265, and a third metallic filter 266 are inserted and fitted in such a manner that they are arranged at intervals. The first metallic filter 264 has a first through hole through which the plastic waste that is fused and transported by the first screw 252 of the first rotational shaft 250 can pass. The second metallic filter 265 has a second through hole through which the fused plastic waste that is primarily filtered by the first metallic filter 264 can pass. The third metallic filter has a third through hole through which the fused plastic waste that is secondarily filtered by the second metallic filter 265 can pass. The internal diameter of the second through hole formed in the second metallic filter 265 is smaller than that of the first through hole formed in the first metallic filter 264. The internal diameter of the third through hole formed in the third metallic filter 266 is smaller than that of the second through hole formed in the second metallic filter 265. Therefore, the impurities that are adhered to the plastic waste, which is fused and transported by the first screw 252, are primarily, secondarily, and thirdly filtered out by the filter unit 260. The impurities that are primarily, secondarily, and thirdly filtered out remain on the first metallic filter 264, the second metallic filter 265, and the third metallic filter 266, and in a space within the filter housing 261. The impurities remaining in the filter housing 261 are removed by separating and cleaning the filter unit 260.

The second crusher 240 is connected to a first motor 330 via an appropriate intervention means such as a gear or a chain gear. The first rotational shaft 250 is connected to a second motor 340 via an appropriate intervention means.

The molding machine 280 is fixed to the housing using a fixing frame 281 and fixing bolts 282. Therefore, the molding machine 280 can be unfixed from the housing as necessary. The gelled plastic waste that passes out through the molding machine 280 is cut into molded objects having a predetermined shape by a blade that is rotated by a motor (not illustrated). The cut gelled plastic waste is introduced into the water tank 310 to be cooled down and becomes pellets. Since the molding machine 280 is removable, it can be replaced with a different type of molding machine.

Water that passes out through the cooling water pipe 271 installed in the hollow of the second rotational shaft 270 is returned to the water tank 310 to be reused.

Hereinafter, operation of the system for pelletizing SRF according to the present invention will be described.

First, plastic waste, especially thermoplastic resin, is collected and introduced into the first crusher 210 manually or by a conveyer belt. Thus, the plastic waste is primarily crushed into shards having a size of several to several tens centimeters by the first crusher 210.

The plastic waste that is primarily crushed is discharged into the vibration sieve plate-conveyer 220 that is equipped with a metal separator and takes the form of a sieve plate having wire meshes or perforations. Metallic impurities mixed with the primarily crushed plastic waste are removed by the metal separator while being transported by the vibration sieve plate-conveyer 220. The vibration of the vibration sieve plate-conveyer 220 causes the impurities that are adhered to the primarily crushed plastic waste to be primarily removed through the meshes or perforations.

Then, the plastic waste from which the impurities are removed is transported by the vibration sieve plate-conveyer 220 and supplied to the hopper 230.

The plastic waste that is supplied to the hopper 230 is secondarily crushed into shards of plastic having a size of several millimeters to several centimeters by the second crusher 240 that is attached to a lower end of the hopper 230.

The secondarily crushed plastic waste is transported to the first rotational shaft 250 that is disposed under the second crusher 240 and equipped with the first screw 252 wherein the first rotational shaft 250 is also equipped with the hot wire 251 in the inside thereof. Therefore, the secondarily crushed plastic waste is fused by the first rotational shaft 250 and the fused plastic waste is transported downstream by the first screw 252.

The plastic waste transported downstream passes through the filter unit 260 that is composed of the first metallic filter 264, the second metallic filter 265, the third metallic filter 266, and the filter housing 261 that encases those filters therein. Impurities in the fused plastic waste are secondarily removed while the fused plastic waste passes through the filter unit 260.

The fused plastic waste that is filtered by the filter unit 260 is transported to the second rotational shaft 270 equipped with the second screw 272. Since the inside of the second rotational shaft 270 is provided with the water pipe 271, the fused plastic waste is cooled down to be gelled while being transported downstream by the second screw 272.

The gelled plastic waste that passes out through the molding machine installed outside the housing 290 is cut into plastic pieces having a predetermined shape by a blade that is rotated by a motor, and the cut plastic pieces are introduced into the water tank 310 to be cooled down to become pellets.

The process of removing the filter unit 260 from the system will be described below.

First, operation of the system for pelletizing SRF according to the present invention is stopped. Next, the second door 320 of the casing 300 and the first door 291 of the housing 290 are sequentially opened. Next, the coupling bolt 292 screwed in the second rotational shaft 270 is unscrewed and pulled out.

Next, the fixing bolts 282 screwed in the fixing frame 281 are unscrewed and pulled out so that the molding machine 280 and the fixing frame 281 can be separated from the housing 290.

Next, the second rotational shaft 270 is pulled backward so that the second rotational shaft 270 is separated from the filter unit 260. Next, the coupling bolt 292 screwed in the first rotational shaft is unscrewed. Next, the filter unit 260 is pulled out. In this way, the filter unit 260 can be removed from the housing 290. The removed filter unit 260 is disassembled to remove impurities therein. After that, the filter unit 260 is reassembled and reused.

The process of reassembling the filter unit 260 is performed in reverse order. Accordingly, a description about the reassembling process will be omitted.

The system for pelletizing SRF according to the preferred embodiment primarily filters out metallic impurities mixed in or adhered to waste plastic using the vibration sieve plate-conveyer equipped with the metal separator and then secondarily filters out the impurities using the filter unit. For this reason, the system according to the preferred embodiment can recycle plastic waste without using water. Therefore, the system can prevent water pollution, reduce water treatment cost, treat a larger amount of raw material compared to a wet process in which water is used, reduce environmental pollution attributable to plastic waste, and reduce operation cost. Furthermore, since the system has a simple structure and the filter unit can be reused after removal of residue thereon because the filter unit is removable from the system, the system has improved durability and incurs decreased production cost.

Although the present invention is described with reference to a preferred embodiment, the preferred embodiment should not be construed as limited thereto but be described for illustrative purposes. Accordingly, those skilled in the art will appreciate that various modifications, additions and substitutions are possible, without departing from the scope and spirit of the invention as disclosed in the accompanying claims. Accordingly, all modifications, alterations, and adjustments without departing from gist of the technical spirit of the present invention may fall within the scope of the present invention.

What is claimed is:

1. A system for pelletizing Solid Refuse Fuel (SRF), the system comprising:
    a first crusher that primarily crushes plastic waste introduced manually or by a conveyer belt;
    a vibration sieve plate-conveyer that transports the primarily crushed plastic waste discharged from the first crusher;
    a hopper that stores the primarily crushed plastic waste discharged from the vibration sieve plate-conveyer;
    a second crusher that is disposed under the hopper and secondarily crushes the primarily crushed plastic waste discharged from the hopper;
    a first rotational shaft that is disposed under the second crusher and is equipped with a first screw that fuses and transports the secondarily crushed plastic waste discharged from the second crusher;
    a filter unit that is combined with the first rotational shaft and removes impurities by filtering the secondarily crushed plastic waste that is fused and transported by the first screw;
    a second rotational shaft equipped with a second screw that transports impurity-free plastic waste that is filtered by the filter unit; and
    a molding machine that molds the impurity-free plastic waste transported by the second screw,
    wherein the first rotational shaft has a structure in which a hot wire is installed in the first rotational shaft and the first screw is installed on an outer surface of the first rotational shaft, thereby simultaneously fusing and transporting the secondarily crushed plastic waste processed by the second crusher, and wherein the second rotational shaft has a structure in which a cooling water pipe is installed in a portion of the second rotational shaft, thereby simultaneously transporting and cooling down the fused plastic waste transported by the first screw so that the fused plastic waste becomes gelled, and
    wherein:
    the filter unit is encased in a filter housing;
    the filter housing is provided with hollow protrusions;
    the hollow protrusions have respective fixing holes; and
    the filter unit is fixed to the first rotational shaft and second rotational shaft by bolts inserted in the fixing holes.

2. The system according to claim 1, wherein:
    the first rotational shaft and the second rotational shaft are spaced from each other; and
    the filter unit is installed between the first rotational shaft and the second rotational shaft.

3. The system according to claim 1, wherein:
    a first metallic filter, a second metallic filter, and a third metallic filter are spaced from each other in the filter unit;
    the first metallic filter has a first through hole through which the fused plastic waste that is fused and transported by the first screw combined with the first rotational shaft pass;
    the second metallic filter has a second through hole through which the fused plastic waste filtered by the first metallic filter passes;
    the third metallic filter has a third through hole through which the fused plastic waste filtered by the second metallic filter passes;
    an internal diameter of the second through hole of the second metallic filter is smaller than an internal diameter of the first through hole of the first metallic filter; and
    an internal diameter of the third through hole of the metallic filter is smaller than the internal diameter of the second through hole of the second metallic filter.

4. The system according to claim 1, further comprising a water tank that cools down the plastic waste that is molded into pellets by the molding machine.

\* \* \* \* \*